United States Patent
Hahn

(10) Patent No.: US 8,966,897 B2
(45) Date of Patent: Mar. 3, 2015

(54) INTERNAL COMBUSTION ENGINE

(75) Inventor: Thomas Hahn, Kirchheimborlanden (DE)

(73) Assignee: BorgWarner Inc., Auburn Hills, MI (US)

( * ) Notice: Subject to any disclaimer, the term of this patent is extended or adjusted under 35 U.S.C. 154(b) by 434 days.

(21) Appl. No.: 13/202,409

(22) PCT Filed: Feb. 19, 2010

(86) PCT No.: PCT/US2010/024660
§ 371 (c)(1),
(2), (4) Date: Aug. 19, 2011

(87) PCT Pub. No.: WO2010/099031
PCT Pub. Date: Sep. 2, 2010

(65) Prior Publication Data
US 2011/0296836 A1  Dec. 8, 2011

(30) Foreign Application Priority Data

Feb. 26, 2009 (DE) .......................... 10 2009 010 650

(51) Int. Cl.
*F02B 33/44* (2006.01)
*F02B 37/013* (2006.01)
(Continued)

(52) U.S. Cl.
CPC ........ *F02M 25/0711* (2013.01); *F02B 29/0481* (2013.01); *F02B 33/446* (2013.01); *F02B 37/002* (2013.01); *F02B 37/013* (2013.01); *F02M 23/006* (2013.01); *F02M 25/0707* (2013.01); *F02B 37/004* (2013.01); *Y02T 10/121* (2013.01); *Y02T 10/146* (2013.01); *Y02T 10/144* (2013.01)

USPC ............... 60/611; 60/612; 60/605.1; 137/220

(58) Field of Classification Search
CPC ...... F02B 33/446; F02B 17/013; F02B 37/18; F02B 37/16; F02B 37/002; F02B 37/004; F02B 29/0481; F02M 25/0707; F02M 25/0711; F02M 23/006; F16K 15/063; F16K 15/026; F05B 2220/40; Y02T 10/121; Y02T 10/144; Y02T 10/146
USPC .......................... 60/611, 612, 605.1; 137/220
IPC ..................... F02B 37/013, 37/16, 39/16, 37/08, F02B 37/04; F02M 35/10
See application file for complete search history.

(56) References Cited

U.S. PATENT DOCUMENTS 1,802,720 A * 4/1931 Junkers .......................... 137/220
2,870,779 A * 1/1959 Thomiszer ..................... 137/219
(Continued)

FOREIGN PATENT DOCUMENTS

JP  52017109 A * 2/1977 .............. F02B 37/08
JP  55005482 A * 1/1980 .............. F02B 37/04

*Primary Examiner* — Thai Ba Trieu
(74) *Attorney, Agent, or Firm* — A. Michael Tucker; Stephan A. Pendorf; Patent Central LLC

(57) ABSTRACT

An internal combustion engine having an air intake section (2) which has an air intake line (3), having an exhaust section (4) which has an exhaust line (5), and having at least one exhaust-gas turbocharger (6) which has a compressor (7) in the air intake line (3) and a turbine (8) arranged in the exhaust line (5), characterized by a controllable bypass arrangement (9) which has an air supply line (10) which, as viewed in the flow direction (R) of the intake air, opens into the air intake line (3) down-stream of the compressor (7).

7 Claims, 1 Drawing Sheet

(51) Int. Cl.
*F02B 37/16* (2006.01)
*F02B 39/16* (2006.01)
*F02M 35/10* (2006.01)
*F16K 1/12* (2006.01)
*F02M 25/07* (2006.01)
*F02B 29/04* (2006.01)
*F02B 37/00* (2006.01)
*F02M 23/00* (2006.01)

(56) References Cited

U.S. PATENT DOCUMENTS

| | | | | |
|---|---|---|---|---|
| 2,919,714 A * | 1/1960 | Mrazek | ............ | 137/220 |
| 3,134,394 A * | 5/1964 | Ohta | ............ | 137/220 |
| 3,194,255 A * | 7/1965 | Flaton et al. | ............ | 137/220 |
| 3,359,998 A * | 12/1967 | Fike | ............ | 137/220 |
| 3,993,093 A * | 11/1976 | Mokveld | ............ | 137/220 |
| 4,373,544 A * | 2/1983 | Goodman et al. | ............ | 137/220 |
| 4,638,832 A * | 1/1987 | Mokveld | ............ | 137/220 |
| 4,747,426 A * | 5/1988 | Weevers | ............ | 137/220 |
| 4,901,703 A * | 2/1990 | Humphries | ............ | 123/559.1 |
| 5,080,122 A * | 1/1992 | Neuzeret | ............ | 137/220 |
| 5,199,261 A * | 4/1993 | Baker | ............ | 60/612 |
| 5,408,979 A * | 4/1995 | Backlund et al. | ............ | 60/612 |
| 5,921,276 A * | 7/1999 | Lam et al. | ............ | 137/220 |
| 6,132,191 A * | 10/2000 | Hugenroth et al. | ............ | 137/220 |
| 7,426,830 B2 * | 9/2008 | Schorn et al. | ............ | 60/612 |
| 7,588,047 B2 * | 9/2009 | Vogt | ............ | 137/220 |
| 7,628,016 B2 * | 12/2009 | Vogt | ............ | 60/612 |
| 8,037,899 B2 * | 10/2011 | Matsubara et al. | ............ | 137/614.2 |
| 8,230,684 B2 * | 7/2012 | Delavan | ............ | 60/612 |
| 2006/0054133 A1 * | 3/2006 | Vogt | ............ | 123/317 |
| 2006/0054848 A1 * | 3/2006 | Vogt | ............ | 251/77 |
| 2008/0256951 A1 * | 10/2008 | Delavan | ............ | 60/602 |
| 2011/0192160 A1 * | 8/2011 | Takahashi et al. | ............ | 60/611 |

\* cited by examiner

INTERNAL COMBUSTION ENGINE

BACKGROUND OF THE INVENTION

1. Field of the Invention

The invention relates to an internal combustion engine.

2. Description of the Related Art

In internal combustion engines having single-stage or multi-stage turbocharging, a vacuum is generated in the engine intake line in certain operating states, such as the engine overrun or braking mode, as a result of an insufficient supply of air, and the engine therefore sucks air and also oil out of the compressor and bearing housing of the turbocharger (or in the case of two-stage turbocharging, out of the compressor and bearing housing of the high-pressure stage), which oil is burned in the combustion chambers. The exhaust-gas values of the internal combustion engine and the oil consumption of the turbocharger are accordingly impaired.

In contrast to this, it is an object of the present invention to create a turbocharged internal combustion engine according to the preamble of claim 1 which enables a sufficient supply of intake air in particular in the engine braking mode and thereby prevents the impairment of the exhaust-gas values and the drastic rise in oil consumption of the exhaust-gas turbocharger.

BRIEF SUMMARY OF THE INVENTION

The object of the invention is achieved by an internal combustion engine 1 having an air intake section 2 which has an air intake line 3; an exhaust section 4 which has an exhaust line 5; at least one exhaust-gas turbocharger 6 which has a compressor 7 in the air intake line 3 and a turbine 8 arranged in the exhaust line 5; and, a controllable bypass arrangement 9 which has an air supply line 10 which, as viewed in the flow direction (R) of the intake air, opens into the air intake line 3 downstream of the compressor 7.

The design according to the invention of a controllable bypass arrangement results in a sufficient air supply to the internal combustion engine in the engine braking mode in that ambient air is sucked in via a bypass arrangement past the high-pressure and low-pressure compressors and is supplied to the air intake section of the internal combustion engine.

The subclaims relate to advantageous refinements of the invention.

The supply of air via the bypass arrangement according to the invention can be controlled by means of a bypass valve. The control may be provided either by means of an independent controller in the event of a vacuum occurring in the engine intake line or by means of a separate control cell/control valve which may for example be connected directly to the intake manifold or else to the high-pressure compressor. Alternatively, control which is dependent on the position of the brake flap may be provided by means of a position sensor and a PWM valve. Furthermore, electric control of the bypass valve by means of the engine control unit and an actuation of the bypass valve by means of an actuating motor or solenoid valve are possible.

BRIEF DESCRIPTION OF THE SEVERAL VIEWS OF THE DRAWINGS

Further details, features and advantages of the invention can be gathered from the following description of an exemplary embodiment on the basis of the drawing, in which.

DETAILED DESCRIPTION OF THE INVENTION

Figure 1:
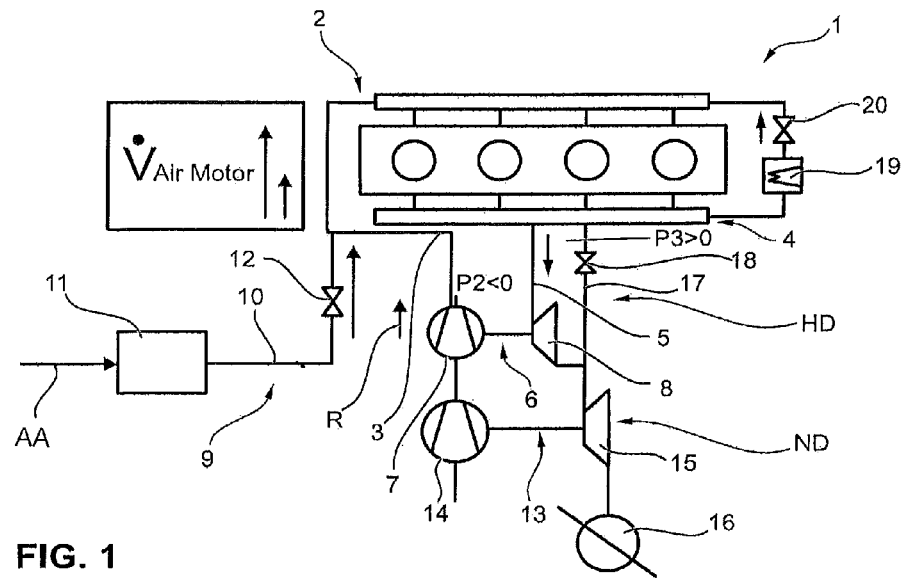
FIG. 1 shows a schematic illustration of the bypass arrangement on a turbocharged internal combustion engine.

FIG. 1 shows a schematic illustration of an internal combustion engine 1 according to the invention having the bypass arrangement according to the invention on the turbocharged internal combustion engine 1. As can be seen from FIG. 1, the internal combustion engine 1 comprises an air intake section 2 and an exhaust section 4. A cooler 19 and a control valve 20 which is arranged downstream are arranged in an exhaust-gas recirculation line between the exhaust section 4 and the air intake section 2. Connected to the exhaust section 4 is an exhaust line 5 which connects the exhaust section 4 to a turbine 8 of a turbocharger 6 of a high-pressure stage HP of a two-stage turbocharger system illustrated in FIG. 1. Also connected to the exhaust section 4 of the internal combustion engine 1 is a bypass line 17 having a bypass control valve 18, which bypass line 17 bypasses the turbine 8. A low-pressure stage LP of the two-stage turbocharger system is arranged downstream of the high-pressure stage HP, which low-pressure stage LP comprises a turbocharger 13 with a turbine 15 and a compressor 14. Furthermore, a brake flap 16 is arranged in the exhaust line 5.

An air intake line 3 leads from the compressor 7 of the high-pressure stage HP to the air intake section 2 of the internal combustion engine 1. An air supply line 10 of a bypass arrangement 9 opens downstream of the compressor 7 in the flow direction R, via the air filter 11 of which air supply line 10 ambient air AA can be introduced into the air intake line 3. A bypass valve 12 is also arranged in the air supply line 10.

Figure 2:
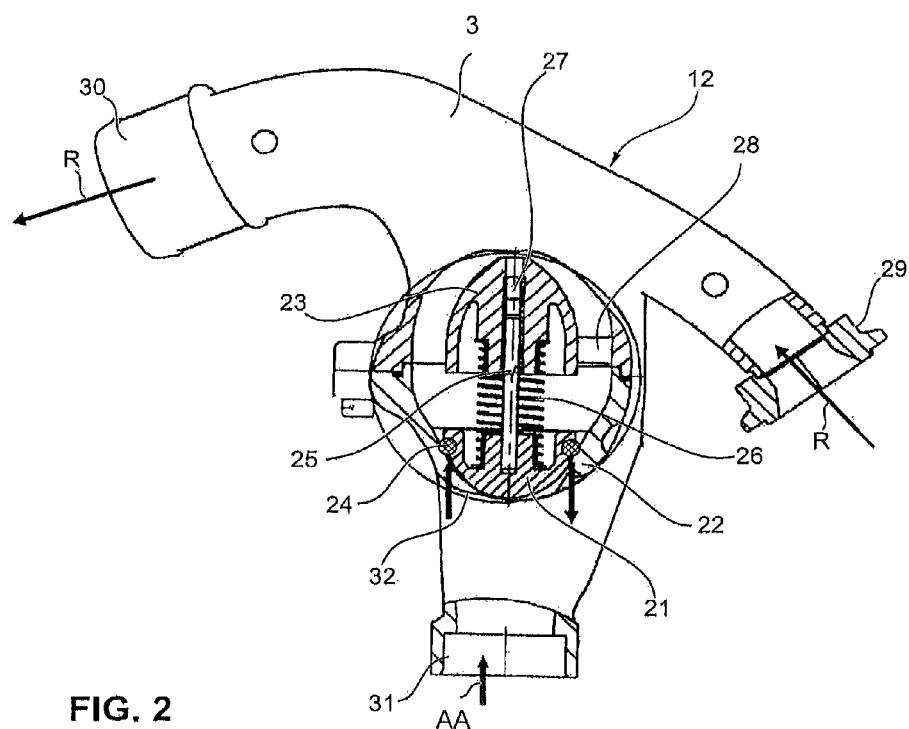
FIG. 2 shows a perspective, partially cut-away illustration of a possible embodiment of the bypass valve of the bypass arrangement of the turbocharged internal combustion engine.

FIG. 2 shows a perspective, partially cut-away drawing of the bypass valve 12. As can be seen from FIG. 2, the bypass valve 12 has a valve housing 22 which is connected via a port 29 to the compressor 7, via a port 30 to the air intake section 2 and via a port 31 to the air supply line 3. The flow direction of the air flowing into the port 29 and of the air flowing out of the port 30 is indicated in each case by an arrow R. The ambient air flowing into the port 31 is denoted by an arrow AA. The valve housing 22 has arranged in it a bearing body 23 which is fastened in the valve housing 22 by means of webs 28. In the interior of the bearing body 23, a pin 25 is held or mounted in a pin bearing arrangement 27. The opposite end of the pin 25 is fastened in a central opening of a valve body 21. A spring 26 is arranged between the bearing body 23 and the valve body 21, which spring 26 seals off the valve body 21 against a sealing seat 32 of the valve housing 22 by means of an O-ring 24.

In the event of a vacuum occurring in the engine braking mode at the side of the compressor 7 which is connected to the port 29, the valve body 21 is lifted up from the sealing seat 32 of the valve housing 22 and the ambient air AA from the air supply line 10 which is connected to the port 31 passes into the valve housing 22 and is supplied via the port 30 and the air intake line 3 to the air intake section 2 of the internal combustion engine 1. In this way, the deficient air supply to the air intake section 2 of the internal combustion engine 1 in the braking mode is prevented by means of the supply of additional air through the bypass arrangement 9, the oil loss via the compressor 7 is prevented and compliance with the correct exhaust-gas emissions values is ensured.

To complete the disclosure, reference is also explicitly made to the diagrammatic illustration of the invention in FIGS. 1 and 2.

LIST OF REFERENCE SYMBOLS

1 Internal combustion engine
2 Air intake section
3 Air intake line
4 Exhaust section
5 Exhaust line
6, 13 Exhaust-gas turbocharger
7, 14 Compressor
8, 15 Turbine
9 Bypass arrangement
10 Air supply line
11 Air filter
12 Bypass valve
16 Brake flap
17 Bypass line
18 Bypass control valve
19 Charge-air cooler
20 Control valve
21 Valve body
22 Valve housing
23 Bearing body
24 O-ring
25 Pin
26 Spring
27 Pin bearing arrangement
28 Web
29, 30, 31 Port
32 Sealing seat
HP High-pressure stage
LP Low-pressure stage

The invention claimed is:

1. An internal combustion engine (1) comprising:
an air intake section (2) which has an air intake line (3);
an exhaust section (4) which has an exhaust line (5);
at least one exhaust-gas turbocharger (6) which has a compressor (7) in the air intake line (3), a turbine (8) arranged in the exhaust line (5), and a bearing housing between the compressor and turbine, said bearing housing supplied with oil;
a controllable bypass arrangement (9) which has an ambient air supply line (10) with a bypass valve (12);
wherein the ambient air supply line (10) is separate from the air intake line (3), bypasses the compressor (7) and, as viewed in the flow direction (R) of the intake air, and opens into the air intake line (3) downstream of the compressor (7) when there is vacuum in the air intake section (2) due to the engine operating in engine overrun or braking mode, thereby the opening of the bypass resulting in sufficient air supply to the engine and preventing suction of air and also oil out of the compressor and bearing housing of the turbocharger.

2. The internal combustion engine (1) as claimed in claim 1, wherein the controllable bypass arrangement (9) has an air filter (11) for filtering ambient air (AA) flowing in from the outside.

3. The internal combustion engine (1) as claimed in claim 2, wherein the controllable bypass arrangement (9) has a bypass valve (12) arranged in the air supply line (10) downstream of the air filter (11).

4. The internal combustion engine (1) as claimed in claim 1, wherein the controllable bypass arrangement (9) is attached directly to the intake manifold of the engine.

5. The internal combustion engine (1) as claimed in claim 1, wherein the bypass valve (12) is actuated mechanically, pneumatically or electrically.

6. The internal combustion engine (1) as claimed in claim 1, wherein the bypass valve (12) has a spring-loaded valve body (21), wherein the spring exerts a force sufficient to close the bypass valve (12) when there is no vacuum in the air intake line (3) but not sufficient to close the bypass valve (12) when there is vacuum in the air intake line (3).

7. An internal combustion engine comprising:
an air intake section (2) which has an air intake line (3);
an exhaust section (4) which has an exhaust line (5);
first and second exhaust-gas turbochargers (6, 13) for forming a two-stage turbocharger arrangement having a high-pressure stage (HP) and having a low-pressure stage (LP), with the air supply line (10) opening into the air intake line (3) downstream of the compressor (7) of the high-pressure stage (HP);
wherein the high pressure stage exhaust-gas turbocharger (6) has a compressor (7) in the air intake line (3), a turbine (8) arranged in the exhaust line (5), and a bearing housing between the compressor and turbine, said bearing housing supplied with oil; and
a controllable bypass arrangement (9) which has an ambient air supply line (10) with a bypass valve (12);
wherein the ambient air supply line (10) bypasses the compressor (7) of the high pressure stage exhaust-gas turbocharger (6) and, as viewed in the flow direction (R) of the intake air, opens into the air intake section (2) downstream of the compressor (7) of the high pressure stage exhaust-gas turbocharger (6) when there is vacuum in the air intake line (3) due to the engine operating in engine overrun or braking mode, thereby the opening of the bypass resulting in sufficient air supply to the engine and preventing suction of air and also oil out of the compressor (7) and the bearing housing of the high pressure stage exhaust-gas turbocharger (6).

* * * * *